United States Patent
Wei

(10) Patent No.: US 9,432,436 B2
(45) Date of Patent: Aug. 30, 2016

(54) PROCESSING METHOD, DISTRIBUTION SERVER, CLIENT, AND SYSTEM FOR STREAMING MEDIA

(71) Applicant: HUAWEI TECHNOLOGIES CO., LTD., Shenzhen (CN)

(72) Inventor: Anni Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 14/088,057

(22) Filed: Nov. 22, 2013

(65) Prior Publication Data

US 2014/0082192 A1 Mar. 20, 2014

Related U.S. Application Data

(63) Continuation of application No. PCT/CN2012/076120, filed on May 25, 2012.

(30) Foreign Application Priority Data

May 25, 2011 (CN) .......................... 2011 1 0137167

(51) Int. Cl.
*G06F 15/16* (2006.01)
*H04L 29/06* (2006.01)
(Continued)

(52) U.S. Cl.
CPC ........... *H04L 65/608* (2013.01); *H04L 41/147* (2013.01); *H04L 43/08* (2013.01);
(Continued)

(58) Field of Classification Search
CPC .................................................... H04L 65/608
USPC ................................. 709/224, 231, 232, 233
See application file for complete search history.

(56) References Cited

U.S. PATENT DOCUMENTS

| 4,559,952 A | * | 12/1985 | Angelsen ................. A61B 8/06 600/455 |
| 2011/0093605 A1 | * | 4/2011 | Choudhury ......... H04L 65/4084 709/231 |

(Continued)

FOREIGN PATENT DOCUMENTS

| CN | 1599341 A | 3/2005 |
| CN | 1630270 A | 6/2005 |

(Continued)

OTHER PUBLICATIONS

Hong et al., "A Receiver-Based Rate Control Scheme for Streaming Video over Wireless" Proceedings of the 2009 IEEE International Conference on Systems, Man, and Cybernetics, San Antonio, TX, USA, Oct. 2009, 6 pages.

(Continued)

*Primary Examiner* — Wing F Chan
*Assistant Examiner* — Joseph Maniwang
(74) *Attorney, Agent, or Firm* — Brinks Gilson & Lione

(57) ABSTRACT

Embodiments of the present invention disclose a processing method, distribution server, client and system for streaming media. The method comprises: receiving content segment request information sent by a client; acquiring resource information of a wireless network where the client is located; predicting a data transmission rate of the wireless network according to the resource information; selecting a content segment matching the data transmission rate; and sending the content segment to the client. In embodiments of the present invention, a distribution server predicts the data transmission rate of the wireless network where the client is located and further selects the content segment with a bitrate matching the data transmission rate for the client, thereby making the bitrate of the content segment sent to the client more appropriate, realizing overall regulation of the bandwidth condition of the cellular wireless network, stable reduction of network congestion, and solving the problem of network congestion.

17 Claims, 9 Drawing Sheets

(51) Int. Cl.
   *H04W 28/02*    (2009.01)
   *H04L 12/26*    (2006.01)
   *H04L 12/811*   (2013.01)
   *H04L 12/24*    (2006.01)
   *H04L 29/08*    (2006.01)

(52) U.S. Cl.
   CPC ........... *H04L43/0882* (2013.01); *H04L 47/38* (2013.01); *H04L 65/4084* (2013.01); *H04L 65/602* (2013.01); *H04L 65/80* (2013.01); *H04L 67/02* (2013.01); *H04W 28/0231* (2013.01)

(56) References Cited

U.S. PATENT DOCUMENTS

2012/0096083 A1   4/2012   Teng et al.
2013/0150007 A1   6/2013   Wang et al.

FOREIGN PATENT DOCUMENTS

| CN | 101022397 A | 8/2007 |
|---|---|---|
| CN | 101616077 A | 12/2009 |
| CN | 101765003 A | 6/2010 |
| CN | 101932029 A | 12/2010 |
| CN | 102025760 A | 4/2011 |

OTHER PUBLICATIONS

Koo et al., "Adaptive Channel Control Scheme to Reduce Channel Zapping Time of Mobile IPTV Service" IEEE 2011, pp. 357-365.

Koo et al., "MARC: Adaptive Rate Control Scheme for Improving the QoE of Streaming Services in Mobile Broadband Networks" ISCIT 2010, 6 pages.

Lee et al., "Quality Adaptive Video Streaming Mechanism Using the Temporal Scalability" IEICE Trans. Commun., vol. E91-B, No. 11, Nov. 2008, 11 pages.

Lee et al., "TCP-Friendly Rate Control Scheme Based on RTP" ICOIN 2006, LNCS 3961, 2006, pp. 660-669.

LTE, "3$^{rd}$ Generation Partnership Project; Technical Specification Group Services and System Aspects; Transparent end-to-end Packet-switched Streaming Service (PSS); Protocol and codecs" (Release 10) 3GPP TS 36.234, V10.0.0, Mar. 2011, 193 pages.

* cited by examiner

PROCESSING METHOD, DISTRIBUTION SERVER, CLIENT, AND SYSTEM FOR STREAMING MEDIA

CROSS-REFERENCE TO RELATED APPLICATION

This application is a continuation of International Application No. PCT/CN2012/076120, filed on May 25, 2012, which claims priority to Chinese Patent Application No. 201110137167.9, filed on May 25, 2011, both of which are incorporated herein by reference in their entireties.

TECHNICAL FIELD

The present invention relates to the field of communications, and in particular, to a processing method, a distribution server, a client, and a system for streaming media.

BACKGROUND

Streaming media technology refers to a technology that releases audios, videos and other multimedia contents in real-time in the form of data streams on the internet. The server compresses and codes the entire multimedia file into multiple compressed packages, and sequentially sends them in real time to the client; and the client is enabled to decompress and play the sent packages while downloading the rest packages to save time. Currently, a server side is capable of making one multimedia file into content segments in different editions and with different bitrates for the client to choose according to the actual condition. For example, in case of a low-bandwidth internet environment, a video stream with a low bitrate can be chosen; in case of a high-bandwidth internet environment, a video stream with a high bitrate can be chosen; and while in case of a variable-bandwidth internet environment, a video stream with a variable bitrate can be chosen. In a wireless network where air-interface resources keep changing, the bitrate of the streaming media shall be adapted according to the changes in air-interface resources, for the sake of more rational utilization rate of air-interface resources and better user experience.

With respect to the issue of bitrate adaption in the wireless network, in self-adaptive HTTP (Hyper Text Transfer Protocol, hyper text transfer protocol) streaming media protocol Adaptive HTTP Streaming of a 3GPP (the 3rd Generation Partnership Project, the $3^{rd}$ generation partnership project), the processing method for HTTP streaming media includes: the client needs to perform bandwidth detection prior to requesting for each content segment, for instance, carries out the bandwidth detection based on the occupation condition of its buffer (buffer). The more the buffer is occupied, the better condition the bandwidth is in, and the more the bandwidth is available; and then the client selects an appropriate bitrate based on the available bandwidth and sends a request to the server. At the meantime, the HTTP streaming media adopts an HTTP request/response (request/response) mode, namely, a content segment is required to be responded for each request.

However, it seems one-sided and not real-time for the client to determine the network bandwidth based only on its buffer condition. For example, if the network of a cell is congested already but the client's buffer is fully occupied, the client may consider that the network bandwidth is sufficient at that time, thereby applying for files with a higher bitrate, which may cause more serious congestions.

SUMMARY

The present invention provides a processing method, a distribution server, a client, and a system for streaming media.

In one aspect, the present invention provides a processing method for streaming media, which includes:
receiving content segment request information sent by a client;
acquiring resource information of a wireless network where the client is located;
predicting a data transmission rate of the wireless network according to the resource information;
selecting a content segment matching the data transmission rate; and
sending the content segments to the client.

In another aspect, the present invention provides a distribution server for streaming media, which includes:
a receiving module, configured to receive content segment request information sent by a client;
a first acquiring module, configured to acquire resource information of a wireless network where the client is located after the receiving module receives the content segment request information sent by the client;
a predicting module, configured to predict a data transmission rate of the wireless network according to the resource information acquired by the first acquiring module;
a selecting module, configured to select a content segment matching the data transmission rate predicted by the predicting module; and
a sending module, configured to send the content segment selected by the selecting module to the client.

In another aspect, the present invention further provides a processing method for streaming media, which includes:
sending content segment request information to a distribution server; and
receiving a content segment sent by the distribution server, where the content segment is a content segment that matches a data transmission rate and is selected by the distribution server, after receiving the content segment request information sent by the client, through acquiring resource information of a wireless network where the client is located and predicting the data transmission rate of the wireless network according to the resource information.

In still another aspect, the present invention provides a client, which includes:
a first sending module, configured to send content segment request information to a distribution server; and
a receiving module, configured to receive, after the first sending module sends the content segment request information to the distribution server, a content segment sent by the distribution server, where the content segment is a content segment that matches a data transmission rate and is selected by the distribution server, after receiving the content segment request information sent by the client, through acquiring resource information of a wireless network where the client is located and predicting the data transmission rate of the wireless network according to the resource information.

In still another aspect, the present invention provides a system for streaming media, which includes a distribution server and a client;
the distribution server is the aforementioned distribution server; and
the client is the aforementioned client.

In all solutions of the present invention, the distribution server acquires the resource information of the wireless network where the client is located, predicts the data transmission rate of the wireless network according to the resource information, and further selects the content segment matching the data transmission rate for the client, thereby making the bitrate of the content segment sent to the client more appropriate, realizing overall regulation of the bandwidth condition of the cellular wireless network and stable reduction of network congestion, and solving the problem of network congestion.

BRIEF DESCRIPTION OF DRAWINGS

To describe the technical solutions in embodiments of the present invention more clearly, the following briefly introduces the accompanying drawings required for describing the embodiments. It is apparent that the accompanying drawings in the following description show merely some embodiments of the present invention, and ordinary persons skilled in the art may still derive other drawings from the accompanying drawings without creative efforts.

DESCRIPTION OF EMBODIMENTS

In order to make the objectives, technical solutions, and advantages more clearly, hereinafter the embodiments of the invention will be illustrated in detail in combination with the accompanying drawings.

A processing method for streaming media according to the embodiments of the present invention is adaptable for HTTP-based streaming media transmission, for example: adaptive HTTP streaming transmission (Adaptive HTTP Streaming) of 3GPP, smooth streaming transmission (Smooth Streaming) of Microsoft IIS (Internet Information Services, internet information services), live HTTP streaming transmission (HTTP Live Streaming) of Apple Inc, HTTP dynamic streaming transmission (HTTP Dynamic Streaming) and RTMP (Real-Time Messaging Protocol, real-time messaging protocol) of Adobe, and other streaming media transmission technologies. The method is also applicable for some streaming media transmission technologies similar to HTTP. The embodiments of the present invention merely take the method applied under the architecture of an Adaptive HTTP Streaming system of 3GPP as an example for illustration, but is not limited to so.

Embodiment 1

Figure 1:
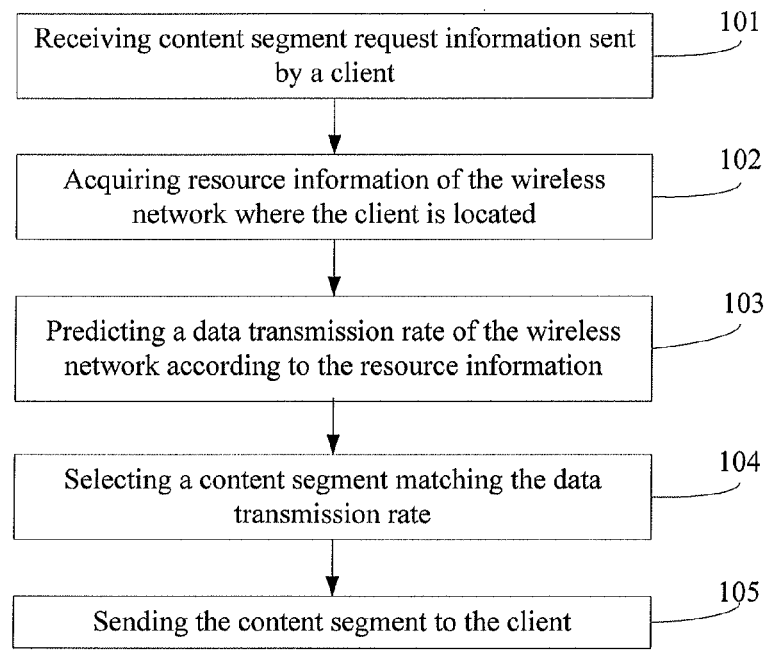
FIG. 1 is a flowchart of a processing method for streaming media according to embodiment 1 of the present invention.

The embodiment of the present invention provides a processing method for streaming media, which can be executed on a distribution server for streaming media. The distribution server for streaming media is located in an RNC (Radio Network Controller, radio network controller) or an eNB (evolved Node B, evolved node B). With reference to FIG. 1, the processing method comprises:

101: receiving content segment request information (Segment Request) sent by a client;

102: acquiring resource information of a wireless network where the client is located;

where the resource information may be signal quality parameter information or a historical transmission rate. Specifically, the signal quality parameter information may be bandwidth, power, gain, signal-noise ratio and other information of the wireless network, and the historical transmission rate refers to the data transmission rate of the wireless network at the time prior to the current time.

103: predicting a data transmission rate of the wireless network according to the resource information;

where the predicted data transmission rate of the wireless network may be specifically the data transmission rate of the client in the wireless network at the next moment.

Optionally, when the resource information is the signal quality parameter information, the predicting method may includes: determining whether the wireless network is congested according to the signal quality parameter information; if congested, determining whether a ratio of traffic of streaming media services in the wireless network to traffic of all services is greater than a first preset threshold, and if yes, predicting that the data transmission rate of the wireless network decreases at the next moment; and if not congested, determining whether a ratio of data in a transmission queue of the distribution server to a size of a buffer area is less than a second preset threshold, and if yes, predicting that the data transmission rate of the wireless network increases at the next moment. Or, when the resource information is a historical transmission rate, the predicting method may include: according to the historical transmission rate, predicting the data transmission rate of the wireless network at the next moment by using a prediction method of linear minimum variance.

The embodiments of the present invention may also adopt other methods to predict the data transmission rate of the wireless network, but is not limited to the aforementioned implementing method.

104: selecting a content segment matching the data transmission rate;

specifically, when sending the next content segment, a content segment with a bitrate matching the data transmission rate can be selected according to the data transmission rate predicted in the previous step.

For example, adopting the aforementioned first predicting method, when it is predicted that the data transmission rate of the wireless network decreases at the next moment, a content segment with a bitrate one level lower than a bitrate of the sent previous content segment may be selected; and when it is predicted that the data transmission rate of the wireless network increases at the next moment, a content segment with a bitrate one level higher than the bitrate of the sent previous content segment may be selected.

For another example, adopting the aforementioned second predicting method, after the data transmission rate of the wireless network at the next moment is predicted, a content segment with a bitrate less than or equal to the data transmission rate may be selected.

105: sending the content segment to the client.

Where when the content segment is sent to the client an HTTP streaming (HTTP Streaming) transmission manner may be adopted, namely, the HTTP request/response mode. Of course, in order to increase transmission efficiency of multimedia files, the content segment may be sent to the client by means of an HTTP chunk (HTTP Chunk) transmission manner.

According to the method provided by the embodiments of the present invention, the distribution server acquires the resource information of the wireless network where the client is located, predicts the data transmission rate of the wireless network according to the resource information, and further selects the content segment matching the data transmission rate for the client, thereby making the bitrate of the content segment sent to the client more appropriate. This results in overall regulation of the bandwidth condition of the cellular wireless network and stable reduction of network congestion, thereby solving the problem of network congestion.

Figure 2:
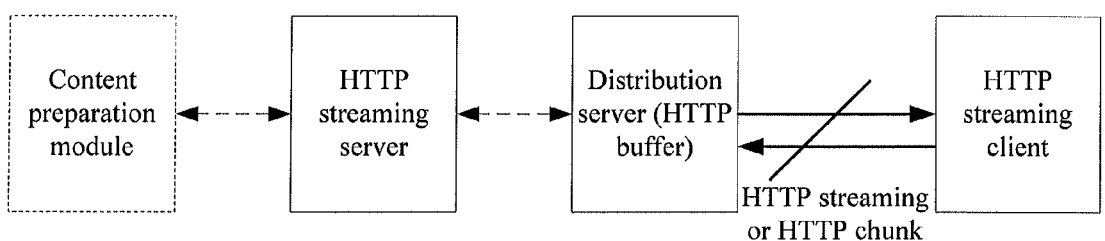
FIG. 2 is a schematic system architecture diagram according to embodiments 2 to 10 of the present invention.

With reference to FIG. 2, it is a systematic architecture of the Adaptive HTTP Streaming of 3GPP, which is an HTTP streaming media architecture based on a distribution server (HTTP Cache). First, a content preparation module (Content Preparation) divides content of a multimedia file into segments and packages the contents of the segments in a format (for example, 3GP format) to meet requirements so as to form content segments, then generates MPD (Media Presentation Description, media presentation description) of the content segments, and pushes the content segments and the MPD to the HTTP streaming server (HTTP Streaming Server), where the MPD is description information on the content segments, mainly including description on information such as each content segment, request construction and multi-bitrate. Second, the HTTP streaming server stores the content segments and MPD received and implants the content segments and the MPD into the distribution server in response to the request of the distribution server, and meanwhile the HTTP streaming server also receives content update from the content preparation module; the distribution server receives an MPD request from an HTTP streaming client (HTTP Streaming Client), and when the requested MPD exists in the buffer of the distribution server, sends the MPD to the client. Finally, the client selects an appropriate bitrate from the received MPD according to the bandwidth resource detected by itself, generates a content segment request information URL (Uniform Resource Locator, uniform resource locator), and requests for a content segment from the distribution server. Herein, the streaming media services include on-demand and live programs.

Embodiment 2

Figure 3:
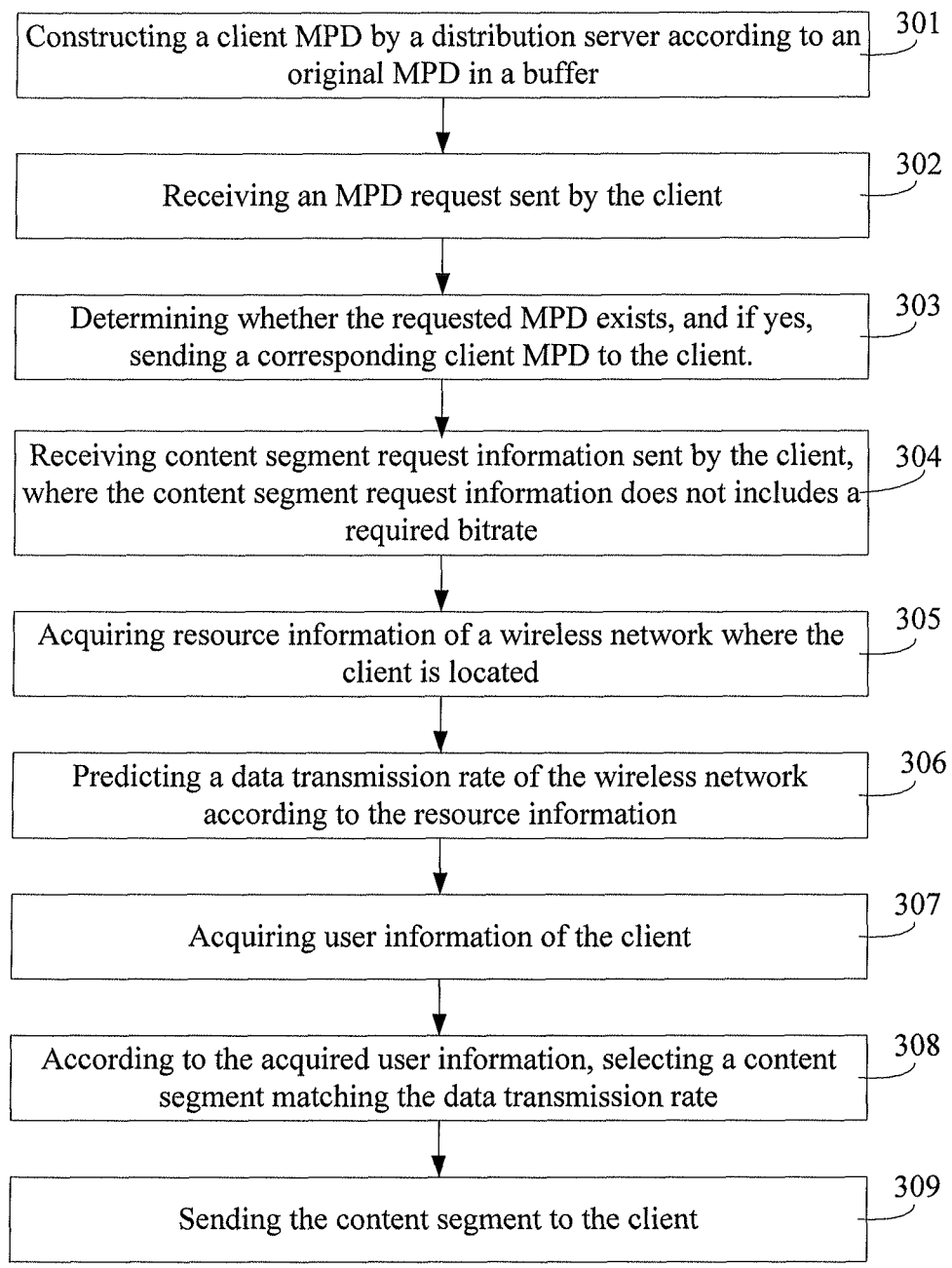
FIG. 3 is a flowchart of a processing method for streaming media according to embodiment 2 of the present invention.

In order to reduce the complexity of the client, and enable the client not to detect the bandwidth resource and select the bitrate, the embodiment of the present invention provides a processing method for streaming media, which can be executed on a distribution server for streaming media, where the distribution server for streaming media may be located in an RNC or eNB of a wireless network. With reference to FIG. 3, the procedures of the processing method includes:

301: constructing a client MPD (Client MPD) by a distribution server according to an original MPD in a buffer;

Specifically, constructing the client MPD may include: removing a Representation (representation) element in the original MPD in the buffer of the distribution server, and saving as the client MPD. Since the client MPD only saves the information for generating a content segment request URL, not carrying other multi-bitrate related information of the content segments in the Representation element, the size of the client MPD is smaller than that of the original MPD. That is to say, the client is not made to perform selection according to the multiple bitrates in the MPD, and then the client no longer needs to perform bandwidth detection by itself.

302: receiving an MPD request sent by a client;

Specifically, the client may acquire the URL of the MPD in an out-of-band manner, and send the MPD request to the distribution server through the URL.

303: determining whether the requested MPD exists, and if yes, sending a corresponding client MPD to the client;

Specifically, if the MPD requested by the client exists in the buffer of the distribution server, the client MPD corresponding to the MPD requested by the client as constructed in step 301 is sent to the client, instead of the original MPD. Since the size of the client MPD is smaller than that of the original MPD, the sending speed is relatively higher.

304: receiving a content segment request information sent by the client, where the content segment request information does not includes a required bitrate;

Specifically, since the client MPD does not carry relevant information in the Representation element, the content segment request information generated by the client according to the client MPD does not carry information of the required bitrate, and thus it is unnecessary for the client to perform detection on occupation condition of its buffer.

305: acquiring resource information of a wireless network where the client is located;

Where the resource information may be a historical transmission rate, which specifically refers to the data transmission rate of the wireless network at a time prior to the current time.

306: predicting a data transmission rate of the wireless network according to the resource information;

Where the predicted data transmission rate of the wireless network may be specifically the data transmission rate of the client in the wireless network at a next moment.

Specifically, according to the historical transmission rate, the data transmission rate of the wireless network at the next moment is predicted by using a prediction method of linear minimum variance. The embodiment of the present invention is not limited to the predicting manner of linear minimum variance, and may also adopt other predicting manners.

For example, the data transmission rate is recorded in a time interval of one second, and the previously recorded historical transmission rates are read as: 962, 914, 884, 813, 758, 990, 1036, 702, 935, 1049, 1013, 946, 933, 734, 1004, 980, 946, 967, 871, 838, 928, 885, 883, 694, 881, 949, 931, 937, 840, 1135, 1033, 940, 1179 (unit: kbps). By means of differential operation, it can be found that the historical transmission rate basically conforms to an ARMA (Auto Regression Moving Average, auto regression moving average) model. According to an autocorrelation and partial correlation analysis method of the ARMA model, by means of an MATLAB (Matrix Laboratory, matrix laboratory) program, the order of the ARMA model ARMA (p, q) is determined, and the data transmission rate at the next moment can be predicted as 918 kbps.

In practical application, the function of the distribution server can be realized in the RNC or eNB of the wireless network, and the data transmission rate of the network may be deduced most immediately at the highest speed by using the RNC or the eNB.

307: acquiring user information of the client;

Where the user information includes user level information and/or terminal capability information. The user level information is a level of a user acquired during subscription, such as golden user, silver user, and bronze user, and the user level defines the bandwidth resource available for the user. The terminal capability information is reported by the client, and contains relevant information of the client terminal where the user is located and a browser, such as screen resolution, terminal system platform, terminal type, terminal IMEI (International Mobile Equipment Identity, international mobile equipment identity), terminal configuration Profile, CPU (Central Processing Unit, central processing unit), memory, etc. The user information may also include other useful information such as user selection information, configured to select languages and subtitles of the content segments.

Specifically, the embodiment of the present invention does not make specific definition on the manner of reporting the terminal capability information by the client, and the terminal capability information can be carried through an HTTP protocol, or through UE Capability (capability), or other manners. When carried through the HTTP protocol, it can be carried in the header field of the HTTP request sent to the distribution server, for example:

GET ######### HTTP/1.1
Accept:*/*
Accept-Language:en-us
Connection:Keep-Alive
Host:#########
User-Agent:Mozilla/4.0(compatible; MSIE 6.0; Windows CE; IEMobile 8.12; MSIEMobile 6.0)
UA-pixels:240×320
UA-color:color16
UA-OS:Windows CE(Pocket PC)—Version 5.2
UA-CPU:x86
Accept-Encoding:gzip,deflate
UA-Voice:TRUE When carried through the UE Capability, the terminal capability information can be transferred through signaling messages between the client and the base station or the base station controller. For example, the UE Capability can be carried in an Attach Request (attach request message) or a TAU Request (tracking area update request message), and is not limited to the two request messages illustrated herein.

308: according to the acquired user information, selecting a content segment matching the data transmission rate;

Optionally, when the acquired user information is the user level information, selecting the content segment with a bitrate less than or equal to the data transmission rate, and less than or equal to the maximum bitrate that may be supported by the client, provided in the user level information;

When the acquired user information is the terminal capability information, selecting the content segment with a bitrate less than or equal to the data transmission rate, and less than or equal to the maximum bitrate that may be supported by the client, provided in the terminal capability information; and When the acquired user information is the user level information and the terminal capability information, selecting the content segment with a bitrate less than or equal to the data transmission rate, and less than or equal to the maximum bitrate that may be supported by the client, provided in the user level information and the terminal capability information.

For example, the distribution server predicts that the data transmission rate of the client in the wireless network may reach 1130 kbps at the next moment, but the user information indicates that the client cannot support the playing of files with a bitrate higher than 845 kbps, at this time, only the content segment with a maximum bitrate of 845 kbps can be responded to the client.

309: sending the content segment to the client.

Where when the content segments are sent to the client, the manner of HTTP streaming (HTTP Streaming), namely, an HTTP request/response mode can be adopted, and for one content segment request, only one content segment is responded. When the client is viewing a whole multimedia file, multiple pieces of content segment request information need to be sent to achieve viewing.

Optionally, in order to increase the transmission efficiency of multimedia files, when the content segments are sent to the client, the HTTP chunk (HTTP Chunk) transmission manner can be adopted. When the HTTP chunk manner is adopted, the client only needs to request once, and the distribution server may send the content segments one by one to the client in the HTTP chunk manner. Where settings can be made in the message header of the HTTP response to perform Chunked encoding transmission, which is as follows:

Transfer-Encoding: Chunked

What should be noted is that, it is only necessary to ensure that the step 307 of acquiring the user information is executed before selecting the matching content segments, that is, the step 307 may be executed at any time before the step 308 is executed. The embodiment of the present invention is merely illustrated in the above sequence, but is not limited to so.

According to the method provided by the embodiment of the present invention, the distribution server acquires the resource information of the wireless network where the client is located, predicts the data transmission rate of the wireless network according to the resource information, and further selects the content segments matching the data transmission rate for the client, thereby achieving the following advantageous effects:

First, the distribution server predicts the data transmission rate of the wireless network at the next moment according to the historical transmission data of the wireless network, which can determine on the whole the network bandwidth condition, and serve as the basis for selecting the content segments matching the data transmission rate for the client and adjusting the bitrate, so as to better solve the problem of network congestion;

Second, in a multi-user cell, in case of network congestion, the distribution server determines the network bandwidth condition on the whole, and the client does not perform selection of bitrates, therefore, the distribution server may adjust the bandwidth of the cell macroscopically so that the network congestion is stably alleviated and the problem of network congestion is solved;

Third, after predicting the data transmission rate of the wireless network, the distribution server immediately assigns the content segment with an appropriate bitrate to the client, thus the effect of carrying out more real-time bitrate adaption is achieved, and the time required by the prior art where the client checks the bandwidth, selects the bitrate, and requests the server to adjust the bitrate is shortened so that the rate of adjusting bitrate in this embodiment can be kept up with the changing rate of network bandwidth;

Fourth, if the distribution server makes an additional reference to user information for bitrate selection, the content segments with a higher bitrate within the client's capacity can be provided to the client when the bandwidth resource is in a sound condition, thereby improving the user experience;

And finally, according to the method provided in this embodiment, the distribution server constructs and uses the client MPD, so the content segment request information sent by the client shall not include the required bitrate, that is to say, it is unnecessary for the client to perform bandwidth detection, so that the complexity is reduced at the client.

In addition, in the HTTP request/response mode adopted by the HTTP streaming media, only one content segment can be responded when one request is sent, in this way, the efficiency is lower for the large number of content segments in the HTTP streaming media. When the HTTP chunk manner in the embodiment of the present invention is adopted to send the content segments to the client, the client only needs to request once, and the distribution server may send the content segments one by one to the client in the HTTP chunk manner, thereby increasing the transmission efficiency of the multimedia files.

Embodiment 3

Figure 4:
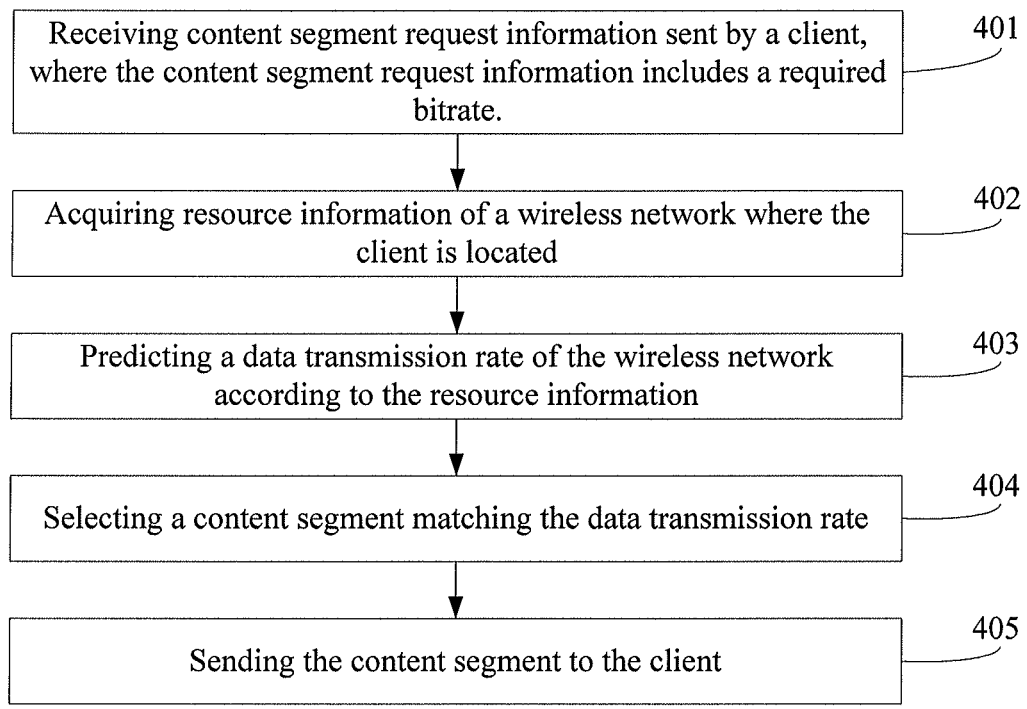
FIG. 4 is a flowchart of a processing method for streaming media according to embodiment 3 of the present invention.

As regards to the subsequent processing, by the distribution server, a content segment request of the client, the embodiment of the present invention provides a processing method for streaming media, which can be executed on a distribution server for streaming media, where the distribution server for streaming media may be located in an RNC or eNB of a wireless network. With reference to FIG. 4, the procedures of the processing method include:

401: receiving content segment request information sent by a client, where the content segment request information includes a required bitrate;

Specifically, the client, after performing bandwidth detection according to the occupation situation of its buffer, selects information such as the required bitrate, resolution and language from a Representation element in the content segment request information, and sends the content segment request information to the distribution server. Assuming that the required bitrate of the client is Bitrate 1.

402: acquiring resource information of a wireless network where the client is located;

403: predicting a data transmission rate of the wireless network according to the resource information;

The implementing manner of steps 402-403 is the same as that of the steps 305-306 in the embodiment 2, and can be known from the steps 305-306, which is not repeated herein.

404: selecting a content segment matching the data transmission rate;

Specifically, comparing the data transmission rate with the required bitrate; when the data transmission rate is less than the required bitrate, selecting the content segment with a bitrate less than or equal to the data transmission rate; and when the data transmission rate is greater than or equal to the required bitrate, selecting the content segment with a bitrate equal to the required bitrate.

That is to say, if the bitrate of the content segment requested by the client is Bitrate 1, the bitrate is compared with the data transmission rate Bitrate 2 predicted by the distribution server, and the content segment with a matched bitrate is selected. Assuming that the bitrate of the selected content segment is Bitrate 3, if the distribution server determines that Bitrate 2<Bitrate 1, then Bitrate 3≤Bitrate 2; and if the distribution server determines that Bitrate 1≥Bitrate 1, then Bitrate 3=Bitrate 1.

For example, media bitrate information carried in the MPD is: 350 kbps, 470 kbps, 630 kbps, 845 kbps and 1130 kbps; when the Bitrate 1=1130 kbps, on the basis of the bandwidth detection of the distribution server, the data transmission rate predicted is Bitrate 2=900 kbps, and the bitrate of the content segment responded is Bitrate 3=845 kbps.

405: sending the content segment to the client.

Please refer to the implementing manner of the step 309 in the embodiment 2 for details, which is not repeated herein.

According to the method provided by the embodiment of the present invention, the distribution server acquires the resource information of the wireless network where the client is located, predicts the data transmission rate of the wireless network according to the resource information, and further selects the content segment matching the data transmission rate for the client with reference to the required bitrate of the client, thereby achieving the following advantageous effects:

First, the distribution server predicts the data transmission rate of the wireless network at the next moment according to the historical transmission data of the wireless network, which can determine on the whole the network bandwidth condition, and serve as the basis for selecting the content segment matching the data transmission rate for the client and adjusting the bitrate, so as to better solve the problem of network congestion;

Second, in a multi-user cell, in case of network congestion, the distribution server determines the network bandwidth condition on the whole, if the required bitrate of the client is high and the data transmission rate predicted by the distribution server is insufficient, the content segment with a lower bitrate is sent to the client, at this time, if the bandwidth saved is still insufficient, a response of a lower bitrate is made to requests for high-bitrate content segments required by other clients as demanded, therefore the distribution server may adjust the bandwidth of the cell macroscopically so that the network congestion is stably alleviated and further the problem of network congestion is solved;

Third, in the prior art, the client, according to the occupation situation of its buffer, detects the bandwidth, selects the bitrate, and requests the server to adjust the bitrate. Upon receiving the request, the server delivers the content segments with the corresponding bitrates so as to adjust the bitrate. The whole period of adjusting the bitrates is overly long, and when the server adjusts the bitrates according to the required bitrate of the client, the network bandwidth condition may have been changed, so it is not timely. According to the method provided in this embodiment, after predicting the data transmission rate of the wireless network, the distribution server immediately assigns the content segment with an appropriate bitrate to the client with reference to the required bitrate of the client, so as to achieve a better effect of adapting the bitrate in real time. In this way, the rate of adjusting the bitrates in this embodiment is kept up with the changing rate of network bandwidth;

In addition, in the HTTP request/response mode adopted by the HTTP streaming media, only one content segment can be responded when one request is sent, in this way, the efficiency is lower for the large number of content segments in the HTTP streaming media. When the HTTP chunk manner in the embodiment of the present invention is adopted to send the content segments to the client, the client only needs to request once, and the distribution server may send the content segments one by one to the client in the HTTP chunk manner, thereby increasing the transmission efficiency of the multimedia files.

Embodiment 4

Figure 5:
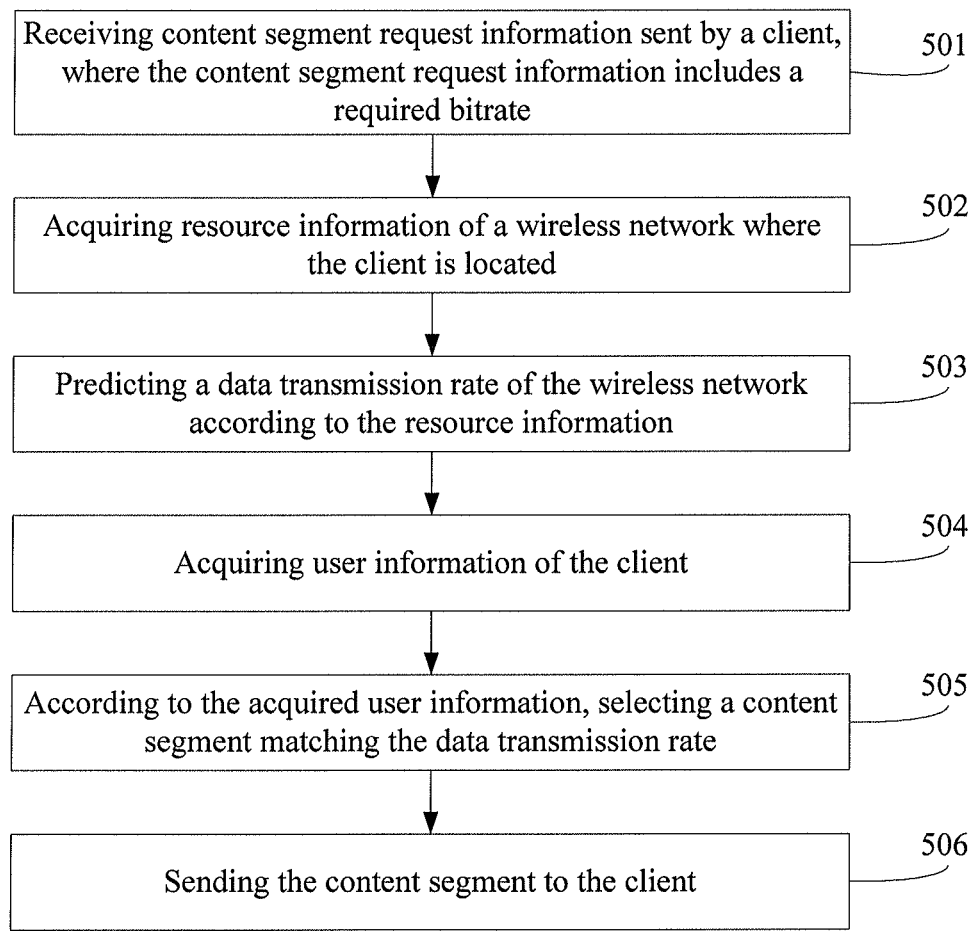
FIG. 5 is a flowchart of a processing method for streaming media according to embodiment 4 of the present invention.

The embodiment of the present invention further provides a processing method for streaming media, which can be executed on a distribution server for streaming media, where the distribution server for streaming media may be located in an RNC or an eNB of a wireless network. With reference to FIG. 5, steps 501-503 are substantially the same as the steps 401-403 in the embodiment 3 respectively, thus being not repeated herein. The main difference between this embodiment and the embodiment 3 lies in that the method further comprises:

504: acquiring user information of the client;

Please refer to the implementing manner of the step 307 in the embodiment 2 for details, which is not repeated herein.

505: according to the acquired user information, selecting a content segment matching the data transmission rate;

Specifically, comparing the data transmission rate with the required bitrate; when the data transmission rate is less than the required bitrate, selecting the content segment with a bitrate less than or equal to the data transmission rate; and when the data transmission rate is greater than or equal to the required bitrate, selecting the content segment according to the following manners:

In one manner, when the acquired user information is the user level information, selecting the content segment with a bitrate greater than or equal to the required bitrate, less than or equal to the data transmission rate, and less than or equal to the maximum bitrate that may be supported by the client provided in the user level information;

When the acquired user information is the terminal capability information, selecting the content segment with a bitrate greater than or equal to the required bitrate, less than or equal to the data transmission rate, and less than or equal to the maximum bitrate that may be supported by the client provided in the terminal capability information;

When the acquired user information is the user level information and the terminal capability information, selecting the content segment with a bitrate greater than or equal to the required bitrate, less than or equal to the data transmission rate, and less than or equal to the maximum bitrate that may be supported by the client provided in the user level information and the terminal capability information.

That is to say, if the bitrate of the content segment requested by the client is Bitrate 1, the bitrate is compared with the data transmission rate Bitrate 2 predicted by the distribution server, and the content segment with the matched bitrates are selected. Assuming that the bitrate of the selected content segment is Bitrate 3, if the distribution server determines that Bitrate 2<Bitrate 1, then Bitrate 3≤Bitrate 2; and if the distribution server determines that Bitrate 2≥Bitrate 1, then Bitrate 1≤Bitrate 3≤Bitrate 4. Bitrate 4 is the maximum bitrate which may be supported by the client provided in the user information.

For example, the media bitrate information carried in the MPD is: 350 kbps, 470 kbps, 630 kbps, 845 kbps and 1130 kbps; when the Bitrate 1=1130 kbps, on the basis of the bandwidth detection of the distribution server, the data transmission rate predicted is Bitrate 2=900 kbps, it is considered there are no enough resources, and the bitrate of the content segment responded is Bitrate 3=845 kbps. When the Bitrate 1=630 kbps, on the basis of the bandwidth detection of the distribution server, the data transmission rate predicted is Bitrate 2=1130 kbps, it is considered there are enough resources, but the user information indicates that the client cannot support the playing of files with a bitrate higher than 845 kbps, and at this time, only the content segment with a maximum bitrate of 845 kbps may be responded to the client.

506: sending the content segment to the client.

Please refer to the implementing manner of the step 309 in the embodiment 2 for details, which is not repeated herein.

What should be noted is that, it is only necessary to ensure that the step 504 of acquiring the user information is executed before selecting the content segments with the matched bitrates, that is, the step 504 may be executed at any time before the step 505 is executed. The embodiment of the present invention is merely illustrated in the above sequence, but not limited to so.

According to the method provided by the embodiment of the present invention, the distribution server acquires the resource information of the wireless network where the client is located, predicts the data transmission rate of the wireless network according to the resource information, and further selects the content segment matching the data transmission rate for the client with reference to the required bitrate of the client and the user information, thereby achieving not only all the advantageous effects in the embodiment 3, but also the following advantageous effects with respect to the embodiment 3:

If the distribution server selects the bitrate with reference to the user information at the same time, when the required bitrate of the client is lower and the bandwidth resource is sufficient, the content segment with a bitrate higher than the required bitrate of the client and falling within the client's capability scope can be provided to the client, so that the selected bitrate is more accurate and appropriate, thereby improving the user experience.

Embodiment 5

Figure 6:
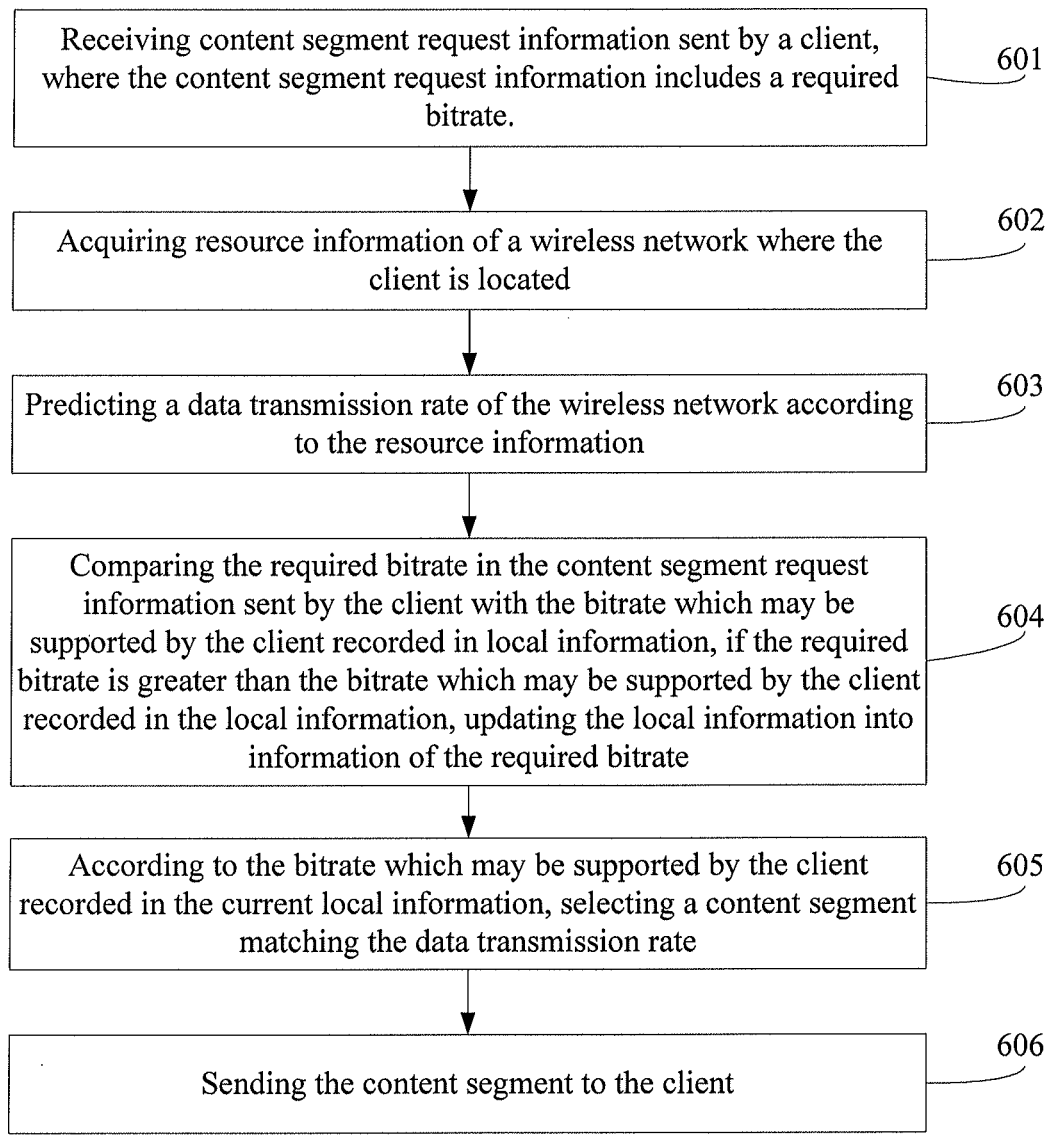
FIG. 6 is a flowchart of a processing method for streaming media according to embodiment 5 of the present invention.

The embodiment of the present invention further provides a processing method for streaming media, which can be executed on a distribution server for streaming media, where the distribution server for streaming media may be located in an RNC or eNB of a wireless network. With reference to FIG. 6, steps 601-603 are substantially the same as the steps 401-403 in the embodiment 3 respectively, which are not repeated herein. The main difference between this embodiment and the embodiment 3 lies in that the method further comprises:

604: comparing the required bitrate in the content segment request information sent by the client with the bitrate which may be supported by the client recorded in local information, and if the required bitrate is greater than the bitrate which may be supported by the client recorded in the local information, updating the local information into information of the required bitrate;

where the local information may be stored locally in various manners, for recording the bitrate that can be supported by the client. The embodiment of the present invention is illustrated by taking establishing a client's bitrate capability table as an example, but not limited to so. With reference to Table 1, it is a new established client's bitrate capability table with every initial value being null:

TABLE 1

| Client identity<br>(Client Identity) | Video streaming identity<br>(Video Identity) | Max bitrate<br>(Max Bitrate) |
|---|---|---|
| NULL | NULL | NULL | where the client identity may be the client's IP (Internet Protocol, internet protocol) address, and may also be other identities; the video streaming identity may be a video URL address identity of a HTTP request, and may also be other identities; and the maximum bitrate is the maximum bitrate applied by the client currently.

As regards the step, each time the client sends the content segment request information, the distribution server needs to determine whether to refresh the bitrate capability table according to the required bitrate in the content segment request information. When the required bitrate is greater than the corresponding maximum bitrate, the bitrate capability table is refreshed, and when the required bitrate is less than or equal to the corresponding maximum bitrate, the bitrate capability table is unchanged. When the content segment request information sent by the client is not recorded in the bitrate capability table, a new initial record is added directly.

For example, when the first content segment request information sent by the client is received, the bitrate carried is Bitrate=845000 bps, and at this time, the client's IP address is 192.168.1.1, the video streaming identity is identified by using the video URL: http://www.example.com/videoname.mp4, and the refreshed client bitrate capability table is as follows:

TABLE 2

| Client identity | Video streaming identity | Max bitrate |
|---|---|---|
| 192.168.1.1 | http://www.example.com/videoname.mp4 | 845000 bps |

At this time, if the distribution server, after performing the bandwidth detection, considers that the current bandwidth environment cannot satisfy the data transmission rate of 845000 bps, it can respond with a content segment with a Bitrate of 630000 bps.

If the bitrate carried in the subsequent content segment request information of the video received from the client is Bitrate=1130000 bps, 1130000 bps>845000 bps, the refreshed client's bitrate capability table is as follows:

TABLE 3

| Client identity | Video streaming identity | Max bitrate |
|---|---|---|
| 192.168.1.1 | http://www.example.com/videoname.mp4 | 1130000 bps |

605: according to the bitrate which may be supported by the client recorded in the current local information, selecting a content segment matching the data transmission rate;

specifically, selecting the content segment with a bitrate less than or equal to the data transmission rate, and less than or equal to the bitrate which may be supported by the client recorded in the current local information.

606: sending the content segment to the client.

Please refer to the implementing manner of the step 309 in the embodiment 2 for details, which is not repeated herein.

It should be noted that, the step 604 may also be executed before the step 603, only if the client's maximum bitrate capability table is established and updated according to the required bitrate in the content segment request information after the content segment request information is received. The embodiment of the present invention does not make definitions on the specific implementing position of the step 604.

According to the method provided by the embodiment of the present invention, the distribution server acquires the resource information of the wireless network where the client is located, predicts the data transmission rate of the wireless network according to the resource information, and further selects the content segment matching the data transmission rate for the client with reference to the required bitrate of the client and the bitrate which may be supported by the client recorded in the current local information, thereby achieving not only all the advantageous effects in the embodiment 3, but also the following advantageous effects with respect to the embodiment 3:

if the distribution server selects the bitrate with reference to the bitrate which may be supported by the client recorded in the current local information at the same time, when the required bitrate of the client is lower and the bandwidth resource is sufficient, the content segment with a bitrate higher than the required bitrate of the client and less than or equal to the maximum bitrate may be provided to the client, so that the selected bitrate may be more accurate and appropriate, thereby improving the user experience.

Embodiment 6

Figure 7:
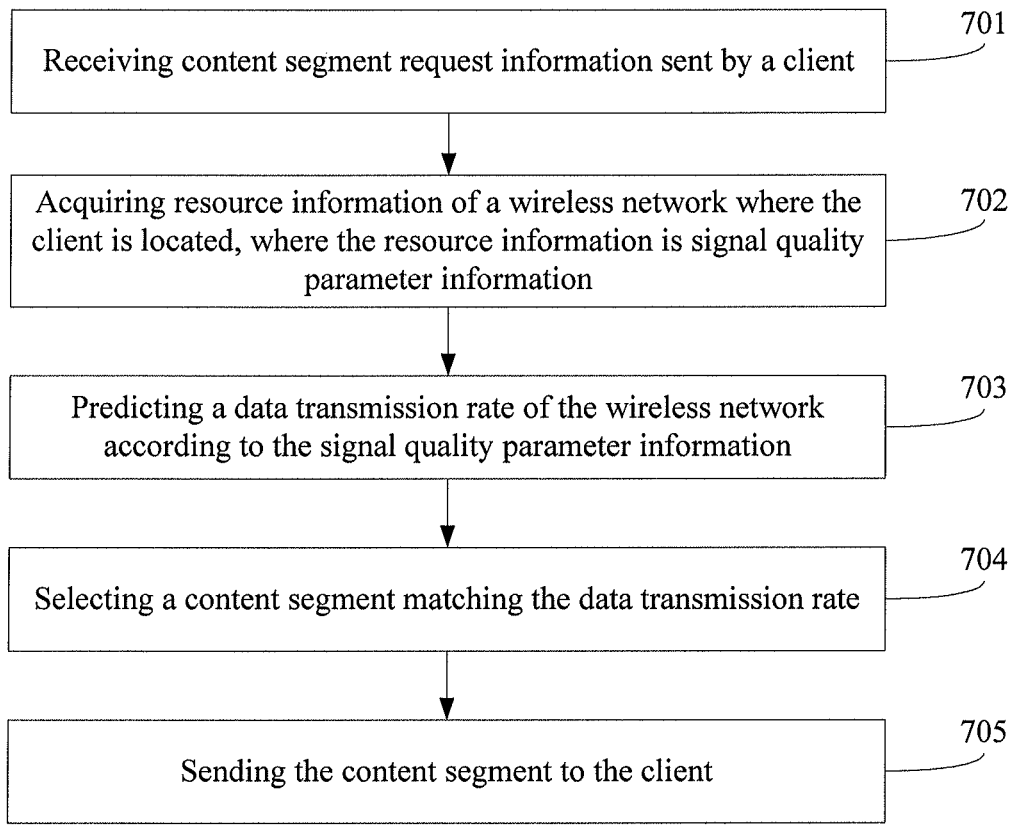
FIG. 7 is a flowchart of a processing method for streaming media according to embodiment 6 of the present invention.

The embodiment of the present invention further provides a processing method for streaming media, which can be executed on a distribution server for streaming media, where the distribution server for streaming media may be located in an RNC or an eNB of a wireless network. With reference to FIG. 7, the processing method includes:

701: receiving content segment request information sent by a client;

702: acquiring resource information of a wireless network where the client is located, where the resource information is signal quality parameter information;

Specifically, the signal quality parameter information may be bandwidth, power, gain, signal-noise ratio and other information of the wireless network.

703: predicting the data transmission rate of the wireless network according to the signal quality parameter information;

Where the predicted data transmission rate of the wireless network may be specifically a data transmission rate of the client in the wireless network at a next moment.

Specifically, determining whether the wireless network is congested according to the signal quality parameter information, if congested, determining whether a ratio of traffic of streaming media services in the wireless network to traffic of all services is greater than a first preset threshold, and if yes, predicting that the data transmission rate of the wireless network decreases at the next moment; and if not congested, determining whether a ratio of data in a transmission queue of the distribution server to a size of a buffer area is less than a second preset threshold, and if yes, predicting that the data transmission rate of the wireless network increases at the next moment.

Hereinafter, predicting the data transmission rate of the wireless network according to the power of the wireless network is taken as an example for illustration: (where $P\_non\_hspa$ represents non-HSPA (High Speed Packet Access, high speed packet access) power, $P\_hsupa\_res$ presents HSUPA (High Speed Uplink Packet Access, high speed uplink packet access) reserved power, $P\_gbr\_str$ represents GBR (Guaranteed Bit Rate, guaranteed bitrate) power of the streaming service, $P\_max$ represents the cell's maximum power, and $Thr\_olc\_trig$ represents an overload trigger threshold).

Assuming that the first preset threshold is 30% and the second preset threshold is 70%, they are not limited to so, and can be set as other values according to the actual situation;

When $P\_non\_hspa+P\_hsupa\_res+P\_gbr\_str > P\_max*Thr\_olc\_trig$, the network is congested, at this time, if a ratio of the traffic of the streaming media services in the wireless network to the traffic of all services is greater than 30%, it is predicted that the data transmission rate of the wireless network decreases at the next moment, and it is necessary to decrease the bitrate of the content segment sent;

When $P\_non\_hspa+P\_hsupa\_res+P\_gbr\_str < P\_max*Thr\_olc\_trig$, the network is not congested, at this time, if a ratio of data in a transmission queue of the distribution server to a size of a buffer area is less than 70%, it is predicted that the data transmission rate of the wireless network increases at the next moment, and it is necessary to increase the bitrate of the content segment sent.

704: selecting the content segment matching the data transmission rate;

Specifically, when it is predicted that the data transmission rate of the wireless network decreases at the next moment, a content segment with a bitrate one level lower than that of the sent previous content segment may be selected; and when it is predicted that the data transmission rate of the wireless network increases at the next moment, a content segment with a bitrate one level higher than that of the previous content segment may be selected.

705: sending the content segment to the client.

Please refer to the implementing manner of the step 309 in the embodiment 2 for details, which is not repeated herein.

According to the method provided by the embodiment of the present invention, the distribution server acquires the signal quality parameter information of the wireless network where the client is located, further predicts whether the data transmission rate of the wireless network increases or decreases according to the signal quality parameter information, and further selects the content segment matching the data transmission rate for the client, thereby achieving the following advantageous effects:

First, the distribution server predicts whether the data transmission rate of the wireless network increases or reduces at the next moment according to the signal quality parameter information of the wireless network, which can determine on the whole the network bandwidth condition, and serve as the basis for reducing or increasing the bitrate of the next content segment on the basis of the bitrate of the previous content segment, so as to better solve the problem of network congestion;

Second, after predicting the data transmission rate of the wireless network, the distribution server immediately assigns the content segment with an appropriate bitrate to the client, thus the effect of carrying out bitrate adaption in real time is achieved, and the time required by the prior art where the client checks the bandwidth, selects the bitrate, and requests the server to adjust the bitrate is shortened. In this way, the speed of adjusting the bitrate in this embodiment is kept up with the changing rate of network bandwidth.

In addition, in the HTTP request/response mode adopted by the HTTP streaming media, only one content segment can be responded when one request is sent, in this way, the efficiency is lower for the large number of content segments in the HTTP streaming media. When the HTTP chunk manner in the embodiment of the present invention is adopted to send the content segments to the client, the client only needs to request once, and the distribution server may send the content segments one by one to the client in the HTTP chunk manner, thereby increasing the transmission efficiency of multimedia files.

Embodiment 7

Figure 8:
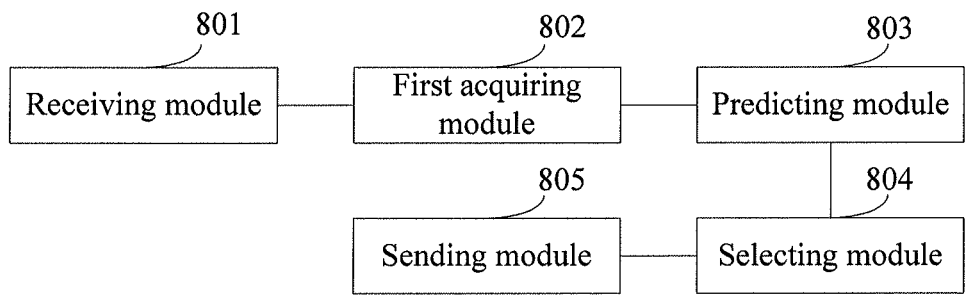
FIG. 8 is a schematic structure diagram of a first distribution server according to embodiment 7 of the present invention.

The embodiment of the present invention provides a distribution server for HTTP streaming media, which can implement the method at the distribution server side in the above method embodiments. With reference to FIG. 8, the distribution server includes:

a receiving module 801, configured to receive content segment request information sent by a client;

a first acquiring module 802, configured to acquire, after the receiving module 801 receives the content segment request information sent by the client, resource information of a wireless network where the client is located;

a predicting module 803, configured to predict a data transmission rate of the wireless network according to the resource information acquired by the first acquiring module 802;

a selecting module 804, configured to select a content segment matching the data transmission rate predicted by the predicting module 803; and a sending module 805, configured to send the content segment selected by the selecting module 804 to the client.

In one implementing manner, the resource information acquired by the first acquiring module 802 includes signal quality parameter information;

Correspondingly, a predicting module 803 is specifically configured to determine whether the wireless network is congested according to the signal quality parameter information, if congested, determine whether a ratio of traffic of streaming media services in the wireless network to traffic of all services is greater than a first preset threshold, and if yes, predict that the data transmission rate of the wireless network decreases at the next moment; and if not congested, determine whether a ratio of data in a local transmission queue to a size of a buffer area is less than a second preset threshold, and if yes, predict that the data transmission rate of the wireless network increases at the next moment, that is to say, particularly configured to realize the content of the step 703 in the present invention;

Correspondingly, a selecting module 804, is specifically configured to select, when it is predicted that the data transmission rate of the wireless network at the next moment reduces, a content segment with a bitrate on level lower than that of the sent previous content segment; and select, when predicting that the data transmission rate of the wireless network at the next moment increases, a content segment with a bitrate one level higher than that of the sent previous content segment.

In this implementing manner, the distribution server acquires the signal quality parameter information of the wireless network where the client is located, further predicts whether the data transmission rate of the wireless network increases or decreases according to the signal quality parameter information, and further selects the content segment matching the data transmission rate for the client, thereby achieving the following advantageous effects:

First, the distribution server predicts whether the data transmission rate of the wireless network increases or decreases according to the signal quality parameter information of the wireless network, which determines on the whole the network bandwidth condition, and serve as the basis for reducing or increasing the bitrate of the next content segment on the basis of the bitrate of the previous content segment, so as to better solve the problem of network congestion; second, after predicting the data transmission rate of the wireless network, the distribution server immediately assigns the content segment with an appropriate bitrate to the client, thus the effect of carrying out bitrate adaption in real time is achieved and the time required by the prior art where the client checks the bandwidth, selects the bitrate, and requests the server to adjust the bitrate is shortened, thereby the speed of adjusting bitrate in this embodiment being kept up with the changing rate of network bandwidth.

In another implementing manner, the resource information acquired by the first acquiring module 802 includes a historical transmission rate;

Correspondingly, the predicting module 803 is specifically configured to predict the data transmission rate of the wireless network at the next moment by using a prediction method of linear minimum variance according to the historical transmission rate.

Figure 9:
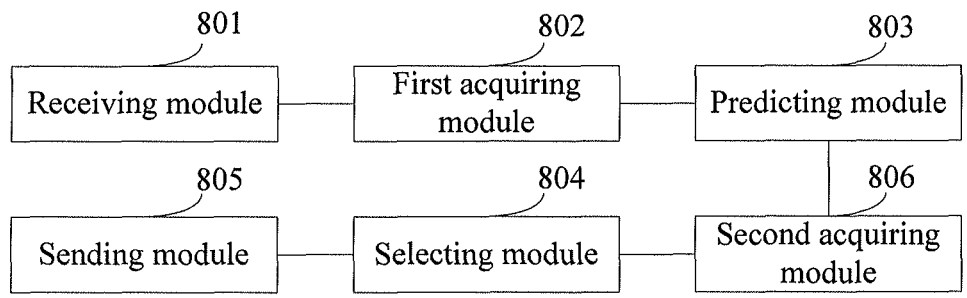
FIG. 9 is a schematic structure diagram of a second distribution server according to embodiment 7 of the present invention.
Figure 10:
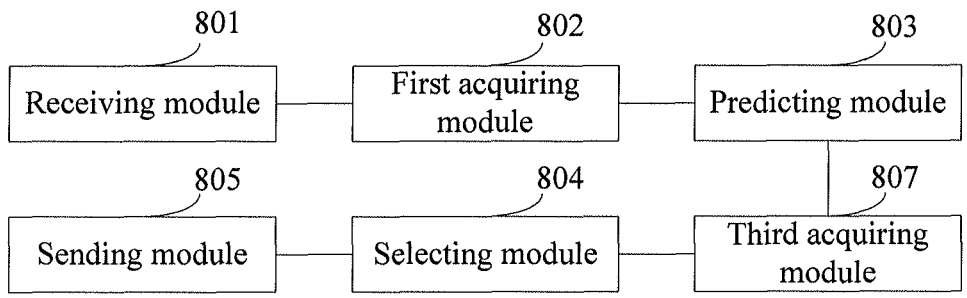
FIG. 10 is a schematic structure diagram of a third distribution server according to embodiment 7 of the present invention.

In this implementing manner, when the content segment request information received by the receiving module 801 does not include the required bitrate, optionally, with reference to FIG. 9, the distribution server may further include:

a second acquiring module 806, configured to acquire, before the selecting module 804 selects the content segment, user level information of the client; correspondingly, the selecting module 804 is specifically configured to select the content segment with a bitrate less than or equal to the data transmission rate, and less than or equal to the maximum bitrate which may be supported by the client provided in the user level information;

Alternatively, optionally, with reference to FIG. 10, the distribution server may further include:

a third acquiring module 807, configured to acquire, before the selecting module 804 selects the content segment, terminal capability information of the client; correspondingly, the selecting module 804 is specifically configured to select the content segment with a bitrate less than or equal to the data transmission rate, and less than or equal to the maximum bitrate which may be supported by the client provided in the terminal capability information.

Figure 11:
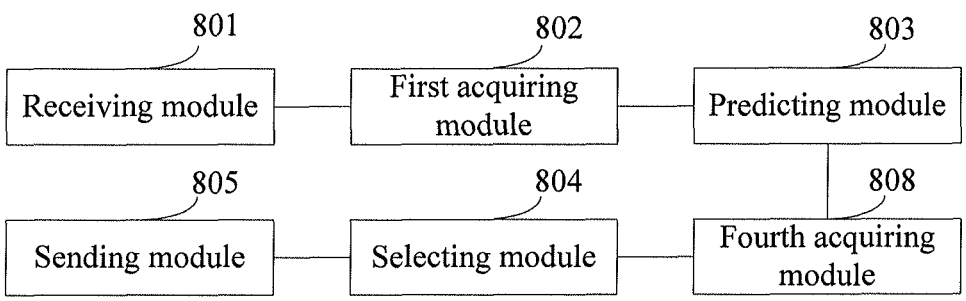
FIG. 11 is a schematic structure diagram of a fourth distribution server according to embodiment 7 of the present invention.

Alternatively, optionally, with reference to FIG. 11, the distribution server may further include:

a fourth acquiring module 808, configured to acquire, before the selecting module 804 selects the content segment, the user level information and the terminal capability information of the client; correspondingly, the selecting module 804 is specifically configured to select the content segment with a bitrate less than or equal to the data transmission rate, and less than or equal to the maximum bitrate which may be supported by the client provided in the user level information and the terminal capability information.

Optionally, in this implementing manner, when the content segment request information received by the receiving module 801 includes the required bitrate, the selecting module 804 is specifically configured to compare the data transmission rate with the required bitrate; select the content segment with a bitrate less than or equal to the data transmission rate when the data transmission rate is less than the required bitrate; and select the content segment with a bitrate equal to the required bitrate when the data transmission rate is greater than or equal to the required bitrate. On such basis, optionally, with reference to FIG. 9, the distribution server may further comprise:

a second acquiring module 806, configured to acquire, before the selecting module 804 selects the content segment, the user level information of the client; correspondingly, the selecting module 804 is specifically configured to compare the data transmission rate with the required bitrate; when the data transmission rate is less than the required bitrate, select a content segment with a bitrate less than or equal to the data transmission rate; when the data transmission rate is greater than or equal to the required bitrate, select a content segment with a bitrate greater than or equal to the required bitrate, less than or equal to the data transmission rate, and less than or equal to the maximum bitrate which may be supported by the client provided in the user level information;

Alternatively, optionally, with reference to FIG. 10, the distribution server may further includes:

a third acquiring module 807, configured to acquire, before the selecting module 804 selects the content segment, the terminal capability information of the client; correspondingly, the selecting module 804 is specifically configured to compare the data transmission rate with the required bitrate; when the data transmission rate is less than the required bitrate, select a content segment with a bitrate less than or equal to the data transmission rate; when the data transmission rate is greater than or equal to the required bitrate, select a content segment with a bitrate greater than or equal to the required bitrate, less than or equal to the data transmission rate, and less than or equal to the maximum bitrate which may be supported by the client provided in the terminal capability information;

Alternatively, optionally, with reference to FIG. 11, the distribution server may further include:

a fourth acquiring module 808, configured to acquire, before the selecting module 804 selects the content segment, the user level information and the terminal capability information of the client; correspondingly, the selecting module 804 is specifically configured to compare the data transmission rate with the required bitrate; when the data transmission rate is less than the required bitrate, select a content segment with a bitrate less than or equal to the data transmission rate; when the data transmission rate is greater than or equal to the required bitrate, select a content segment with a bitrate greater than or equal to the required bitrate, less than or equal to the data transmission rate, and less than or equal to the maximum bitrate which may be supported by the client provided in the user level information and the terminal capability information.

Figure 12:
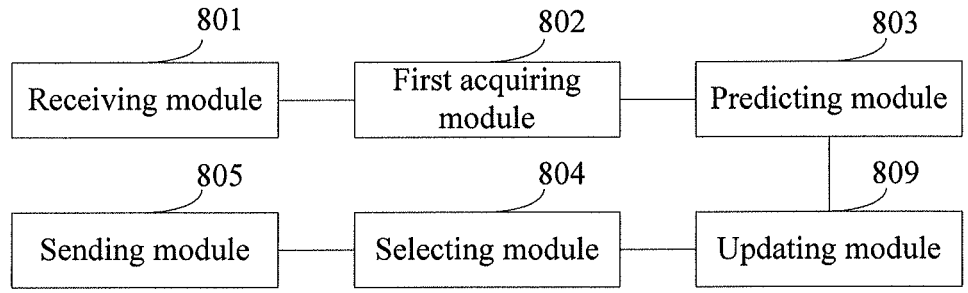
FIG. 12 is a schematic structure diagram of a fifth distribution server according to embodiment 7 of the present invention.

Alternatively, optionally, with reference to FIG. 12, when the content segment request information received by the receiving module 801 includes the required bitrate, the distribution server further includes:

an updating module 809, configured to compare, before the selecting module 804 selects the content segment, the required bitrate with the bitrate which may be supported by the client recorded in local information, if the required bitrate is greater than the bitrate which may be supported by the client recorded in the local information, update the local information into information of the required bitrate; correspondingly, the selecting module 804 is specifically configured to select a content segment with a bitrate less than or equal to the data transmission rate, and less than or equal to the bitrate which may be supported by the client recorded in the current local information.

Furthermore, the aforementioned sending module 805 may be configured to send the content segment to the client by means of the HTTP chunk transmission manner.

The advantageous effects of the aforementioned second implementing manner are as follows:

First, the distribution server predicts the data transmission rate of the wireless network at the next moment according to the historical transmission data of the wireless network, which determines on the whole the network bandwidth condition, and serve as the basis for selecting the content segment matching the data transmission rate for the client and adjusting the bitrate, so as to better solve the problem of network congestion;

Second, in a multi-user cell, in case of network congestion, the distribution server determines the network bandwidth condition on the whole, and the client does not carry out bitrate selection, therefore, the distribution server may adjust the bandwidth of the cell macroscopically, so that the network congestion is stably alleviated and the problem of network congestion is solved;

Third, in the prior art, the client detects the bandwidth according to the occupation situation of its buffer, selects the bitrate, and requests the server to adjust the bitrate. Upon receiving the request, the server delivers the content segments with the corresponding bitrates so as to adjust the bitrate. The whole period of adjusting the bitrate is overly long, and when the server adjusts the bitrate according to the required bitrate of the client, the network bandwidth condition may have been changed, so it is not timely. According to the method provided in this embodiment, the distribution server predicts the data transmission rate of the wireless network, and then immediately assigns the content segment with an appropriate bitrate to the client with reference to the required bitrate of the client, so as to achieve a better effect of performing the bitrate adaption in real time. In this way, the speed of adjusting bitrate in this embodiment is kept up with the changing rate of network bandwidth;

Finally, if the distribution server makes an additional reference to the user level information and the terminal capability information for bitrate selection, the content segment with a higher bitrate within the client's capability scope can be provided to the client when the bandwidth resource is in a sound condition, thereby improving the user experience;

In addition, in the HTTP request/response mode adopted by the HTTP streaming media, only one content segment can be responded when one request is sent, the efficiency is relatively low for the large number of content segments in the HTTP streaming media. When the HTTP chunk manner in the embodiment of the present invention is adopted to send the content segments to the client, the client only needs to request once, and the distribution server may send the content segments one by one to the client in the HTTP chunk manner, thereby increasing the transmission efficiency of multimedia files.

Embodiment 8

Figure 13:
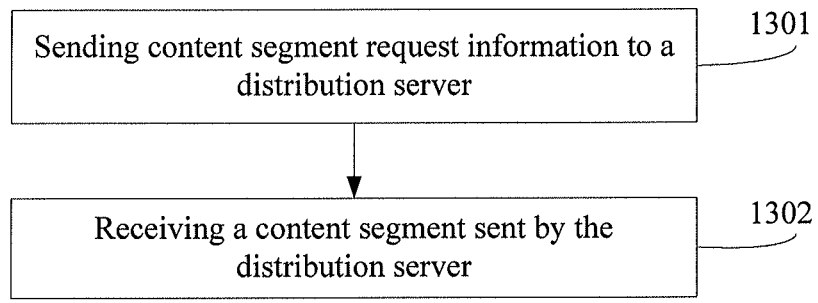
FIG. 13 is a flowchart of a processing method for streaming media according to embodiment 8 of the present invention.

The embodiment of the present invention provides a processing method for streaming media, which can be executed on a client requesting the streaming media content to the distribution server. With reference to FIG. 13, the procedures of the method includes:

1301: sending content segment request information to a distribution server;

Optionally, the content segment request information may include or not includes the required bitrate.

1302: Receiving a content segment sent by the distribution server.

Where the content segment is a content segment that matches a data transmission rate and selected by the distribution server, after receiving the content segment request information sent by the client, through acquiring resource information of a wireless network where the client is located and predicting the data transmission rate of the wireless network according to the resource information.

When the content segment request information sent in the step 1301 does not includes the required bitrate, before receiving the content segment sent by the distribution server, optionally, any one of the following implementing manners may also be included:

In one implementing manner, user level information is sent to the distribution server; correspondingly, the received content segment is a content segment which is selected by the distribution server and with a bitrate less than or equal to the data transmission rate of the wireless network, and less than or equal to with the maximum bitrate which may be supported by the client provided in the user level information.

In another implementing manner, terminal capability information is sent to the distribution server; correspondingly, the received content segment is a content segment which is selected by the distribution server and with a bitrate less than or equal to the data transmission rate of the wireless network, and less than or equal to the maximum bitrate which may be supported by the client provided in the terminal capability information.

In still another implementing manner, the user level information and the terminal capability information are sent to the distribution server; correspondingly, the received content segment is a content segments which is selected by the distribution server and with a bitrate less than or equal to the data transmission rate of the wireless network, and less than or equal to the maximum bitrate which may be supported by the client provided in the user level information and the terminal capability information.

Furthermore, when the content segment request information sent in the step 1301 includes the required bitrate, specifically, the received content segment is a content segment, selected by the distribution server through comparing the data transmission rate of the wireless network with the required bitrate, with a bitrate less than or equal to the data transmission rate when the data transmission rate is less than the required bitrate, or a content segment selected with a bitrate equal to the required bitrate when the data transmission rate is greater than or equal to the required bitrate.

Further, when the content segment request information sent in the step 1301 includes the required bitrate, before receiving the content segment sent by the distribution server, optionally, any one of the following implementing manners may also be included:

In one implementing manner, user level information is sent to the distribution server; correspondingly, the content segment received is a selected content segment, selected by the distribution server through comparing the data transmission rate of the wireless network with the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to the maximum bitrate which may be supported by the client provided in the user level information when the data transmission rate is greater than or equal to the required bitrate.

In another implementing manner, terminal capability information is sent to the distribution server; correspondingly, the content segment received is a content segment, selected by the distribution server through comparing the data transmission rate of the wireless network with the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to the maximum bitrate which may be supported by the client provided in the terminal capability information when the data transmission rate is greater than or equal to the required bitrate.

In another implementing manner, the user level information and the terminal capability information are sent to the distribution server; correspondingly, the content segment received is a content segment, selected by the distribution server through comparing the data transmission rate of the wireless network with the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to the maximum bitrate which may be supported by the client provided in the user level information and the terminal capability information when the data transmission rate is greater than or equal to the required bitrate.

According to the method provided by the embodiment of the present invention, the client sends the content segment request information to the distribution server, the distribution server selects the content segment matching the data transmission rate of the wireless network for the client, such that the bitrate of the content segment sent to the client can better adapt to the network environment. If the client additionally sends user information such as the user level information or the terminal capability information to the server, the distribution server can select a more appropriate bitrate in combination with the user information, when the required bitrate of the client is relatively low and the bandwidth resource is in good condition, the distribution server can provide the client with the content segment with a bitrate higher than the required bitrate of the client and less than or equal to the maximum bitrate supported by the client, thereby improving the user experience.

Embodiment 9

Figure 14:
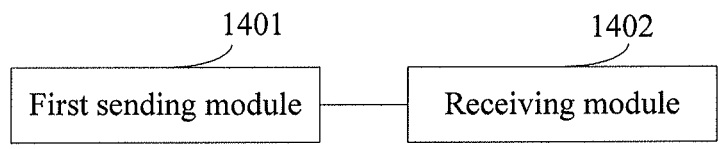
FIG. 14 is a schematic structure diagram of a first client according to embodiment 9 of the present invention.

With reference to FIG. 14, the embodiment of the present invention provides a client, which can implement the method at the client side in the aforementioned method embodiment, the client includes:

a first sending module 1401, configured to send content segment request information to a distribution server;

a receiving module 1402, configured to receive, after the first sending module 1401 sends the content segment request information to the distribution server, a content segment sent by the distribution server, where the content segment is a content segment which matches a data transmission rate and is selected by the distribution server, after receiving the content segment request information sent by the client, through acquiring resource information of a wireless network where the client is located and predicting the data transmission rate of the wireless network according to the resource information.

Figure 15:
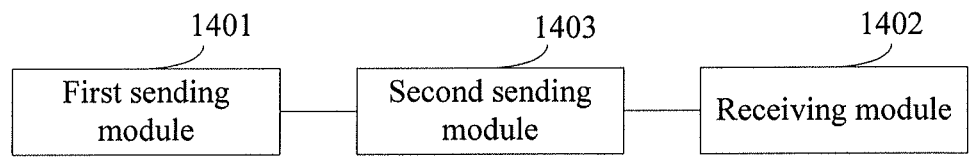
FIG. 15 is a schematic structure diagram of a second client according to embodiment 9 of the present invention.
Figure 16:
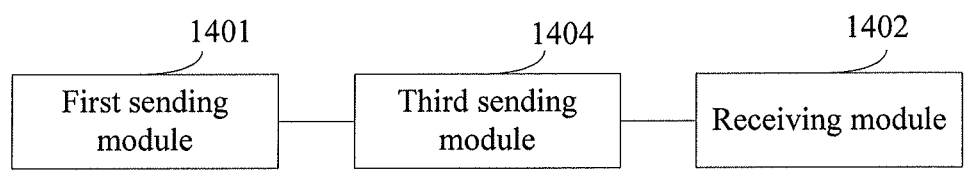
FIG. 16 is a schematic structure diagram of a third client according to embodiment 9 of the present invention.
Figure 17:
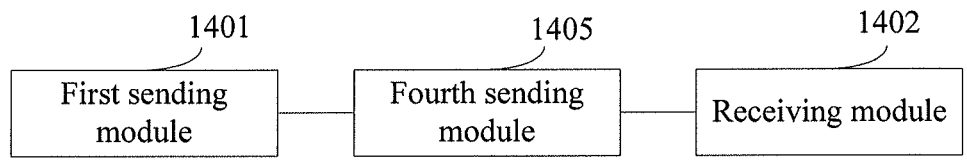
FIG. 17 is a schematic structure diagram of a fourth client according to embodiment 9 of the present invention.

When the content segment request information sent by the first sending module 1401 does not includes the required bitrate, optionally, the client may includes any one of the following modules:

With reference to FIG. 15, a second sending module 1403, configured to send, before the receiving module 1402 receives the content segment sent by the distribution server, user level information to the distribution server; correspondingly, the content segment received by the receiving module 1402 is a content segment, selected by the distribution server, with a bitrate less than or equal to the data transmission rate of the wireless network, and less than or equal to the maximum bitrate which may be supported by the client provided in the user level information;

Or, with reference to FIG. 16, a third sending module 1404, configured to send, before the receiving module 1402 receives the content segment sent by the distribution server, terminal capability information to the distribution server; correspondingly, the content segment received by the receiving module 1402 is a content segment, selected by the distribution server, with a bitrate less than or equal to the data transmission rate of the wireless network, and less than or equal to the maximum bitrate which may be supported by the client provided in the terminal capability information;

Or, with reference to FIG. 17, a fourth sending module 1405, configured to send, before the receiving module 1402 receives the content segments sent by the distribution server, the user level information and the terminal capability information to the distribution server; correspondingly, the content segment received by the receiving module 1402 is a content segment, selected by the distribution server, with a bitrate less than or equal to the data transmission rate of the wireless network, and less than or equal to the maximum bitrate which may be supported by the client provided in the user level information and the terminal capability information.

When the content segment request information sent by the first sending module 1401 includes the required bitrate, specifically, the content segment received by the receiving module 1402 is a content segment, selected by the distribution server through comparing the data transmission rate of the wireless network with the required bitrate, with a bitrate less than or equal to the data transmission rate when the data transmission rate is less than the required bitrate, or a content segment selected with a bitrate equal to the required bitrate when the data transmission rate is greater than or equal to the required bitrate.

Further, when the content segment request information sent by the first sending module 1401 includes the required bitrate, optionally, the client may includes any one of the following modules:

with reference to FIG. 15, a second sending module 1403, configured to send, before the receiving module 1402 receives the content segment sent by the distribution server, user level information to the distribution server; correspondingly, the content segment received by the receiving module 1402 is a content segment, selected by the distribution server through comparing the data transmission rate of the wireless network and the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to the maximum bitrate which may be supported by the client provided in the user level information when the data transmission rate is greater than or equal to the required bitrate;

Or, with reference to FIG. 16, a third sending module 1404, configured to send, before the receiving module 1402 receives the content segment sent by the distribution server, terminal capability information to the distribution server; correspondingly, the content segment received by the receiving module 1402 is a content segment, selected by the distribution server through comparing the data transmission rate of the wireless network and the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to the maximum bitrate which may be supported by the client provided in the terminal capability information when the data transmission rate is greater than or equal to the required bitrate;

Or, with reference to FIG. 17, a fourth sending module 1405, configured to send, before the receiving module 1402 receives the content segment sent by the distribution server, user level information and terminal capability information to the distribution server; correspondingly, the content segment received by the receiving module 1402 is a content segment, selected by the distribution server through comparing the data transmission rate of the wireless network and the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to the maximum bitrate which may be supported by the client provided in the user level information and the terminal capability information when the data transmission rate is greater than or equal to the required bitrate.

According to the embodiment of the present invention, the client sends the content segment request information to the distribution server, the distribution server selects the content segment matching the data transmission rate of the wireless network for the client, such that the bitrate of the content segment sent to the client can better adapt to the network environment. If the client additionally sends user information such as the user level information or the terminal capability information to the server, the distribution server can select a more appropriate bitrate in combination with the user information; and when the required bitrate of the client is relatively low and the bandwidth resource is in good condition, the distribution server can provide the client with the content segment with a bitrate higher than the required bitrate of the client and less than or equal to the maximum bitrate which may be supported by the client, thereby improving the user experience.

Embodiment 10

Figure 18:
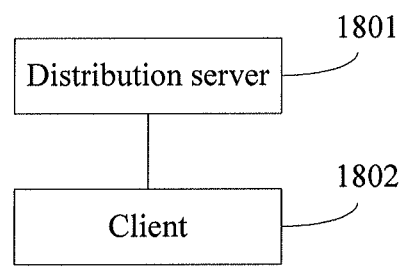
FIG. 18 is a schematic structure diagram of a system for streaming media according to embodiment 10 of the present invention.

With reference to FIG. 18, the embodiment of the present invention provides a system for streaming media, including a distribution server 1801 and a client 1802;

wherein the distribution server 1801 is a distribution server according to the aforementioned embodiment 7; and the client 1802 is a client according to the aforementioned embodiment 9.

According to the system provided by the embodiment of the present invention, the distribution server predicts the data transmission rate of the wireless network where the client is located, and further selects the content segment matching the data transmission rate for the client. Since the predicted data transmission rate of the wireless network is more accurate and the bandwidth of the cell is adjusted macroscopically, network congestion can be steadily alleviated, and the problem of network congestion is solved; and meanwhile, after predicting the data transmission rate at the next moment, the distribution server immediately assigns the content segment with an appropriate bitrate to the client, thereby achieving faster bitrate adaption.

It should be noted that: the distribution server and client according to the above embodiment, when transmitting steaming media files, are merely illustrated by taking the division of the above functional modules, and in the actual application, the above function can be allocated to be accomplished by different functional modules as demanded, that is, the internal structures of the distribution server and the client are divided into different functional modules for accomplishing all or partial aforementioned functions. In addition, the distribution server and the client according to the above embodiments belong to the same concept as the embodiment of the processing method for streaming media, and the implementing procedures thereof are given in the method embodiments for details, thus being not repeated herein.

The numbering of the aforementioned embodiments of the present invention is merely given for description, not standing for the ranking of advantageous level of the embodiments.

All or partial steps in the embodiment of the present invention can be implemented by means of hardware, or be accomplished by relevant hardware instructed by programs, and the programs may be stored in a readable storage medium, such as an optical disk or a hard disk.

The foregoing descriptions are merely preferred embodiments of the present invention, but are not intended to limit the present invention. Any variation, equivalent replacement, and improvement made within the spirit and principle of the present invention shall fall within the protection scope of the present invention.

The invention claimed is:

1. A processing method for streaming media of a distribution server which comprises at least a processor executing program codes stored in a memory, which configure the distribution server to perform functions, comprising:

receiving, by the processor, content segment request information sent by a client;

acquiring, by the processor, resource information of a wireless network where the client is located, wherein the resource information comprises a historical transmission rate;

predicting, by the processor, a data transmission rate of the wireless network according to the resource information, wherein predicting the data transmission rate of the wireless network according to the resource information, comprises:

according to the historical transmission rate, predicting, by the processor, the data transmission rate of the wireless network at a next moment by using a prediction method of linear minimum variance;

selecting, by the processor, a content segment matching the data transmission rate; and sending, by the processor, the content segment to the client.

2. The processing method according to claim 1, wherein before receiving the content segment request information sent by the client, the method further comprises:

constructing, by the processor, a client media presentation description by a distribution server according to an original media presentation description in a buffer, wherein the client media presentation description does not carry multi-bitrate related information;

receiving, by the processor, a media presentation description request sent by a client;

determining, by the processor, whether the requested media presentation description exists, and when the requested media presentation description exists, sending a corresponding client media presentation description to the client.

3. The processing method according to claim 1, wherein the content segment request information does not comprise a required bitrate;

before selecting the content segment matching the data transmission rate, the method further comprises:

acquiring, by the processor, user level information and/or terminal capability information of the client;

correspondingly, selecting the content segment matching the data transmission rate comprises:

selecting, by the processor, a content segment with a bitrate less than or equal to the data transmission rate, and less than or equal to a maximum bitrate which may be supported by the client provided in the user level information and/or the terminal capability information.

4. The processing method according to claim 1, wherein the content segment request information comprises a required bitrate;

selecting the content segment matching the data transmission rate comprises:

comparing, by the processor, the data transmission rate with the required bitrate;

when the data transmission rate is less than the required bitrate, selecting, by the processor, a content segment with a bitrate less than or equal to the data transmission rate; and when the data transmission rate is greater than or equal to the required bitrate, selecting, by the processor, a content segment with a bitrate equal to the required bitrate.

5. The processing method according to claim 1, wherein the content segment request information comprises a required bitrate;

before selecting the content segment matching the data transmission rate, the method further comprises:

acquiring, by the processor, user level information and/or terminal capability information of the client;

correspondingly, selecting the content segment matching the data transmission rate comprises:

comparing, by the processor, the data transmission rate with the required bitrate;

when the data transmission rate is less than the required bitrate, selecting, by the processor, a content segment with a bitrate less than or equal to the data transmission rate; and when the data transmission rate is greater than or equal to the required bitrate, selecting, by the processor, a content segment with a bitrate greater than or equal to the required bitrate, less than or equal to the data transmission rate, and less than or equal to a maximum bitrate which may be supported by the client provided in the user level information and/or the terminal capability information.

6. The processing method according to claim 1, wherein the content segment request information comprises a required bitrate;

before selecting the content segment matching the data transmission rate, the method further comprises:

comparing, by the processor, the required bitrate with a bitrate which may be supported by the client recorded in local information; and if when the required bitrate is greater than the bitrate which is supported by the client recorded in the local information, updating the local information into information of the required bitrate;

correspondingly, selecting the content segment matching the data transmission rate comprises:

selecting, by the processor, a content segment with a bitrate less than or equal to the data transmission rate, and less than or equal to the bitrate which may be supported by the client recorded in the current local information.

7. A distribution server for streaming media, comprising at least a processor and a memory, the processor executing program codes stored in the memory, which configure the distribution server to:

receive content segment request information sent by a client;

acquire, after the distribution server receives the content segment request information sent by the client, resource information of a wireless network where the client is located, wherein the resource information acquired by the distribution server comprises a historical transmission rate;

predict a data transmission rate of the wireless network according to the resource information acquired by the distribution server, wherein the distribution server is specifically configured to predict the data transmission rate of the wireless network at a next moment by using a prediction method of linear minimum variance according to the historical transmission rate;

select a content segment matching the data transmission rate predicted by the distribution server; and send the content segment selected by the distribution server to the client.

8. The distribution server according to claim 7, wherein the content segment request information received by the distribution server does not comprise a required bitrate;

wherein the distribution server is further configured to:

acquire, before the distribution server selects the content segment, user level information of the client; and correspondingly, select a content segment with a bitrate less than or equal to the data transmission rate, and less than or equal to a maximum bitrate which may be supported by the client provided in the user level information;

or the distribution server is further configured to:

acquire, before the distribution server selects the content segment, terminal capability information of the client; and correspondingly, select a content segment with a bitrate less than or equal to the data transmission rate, and less than or equal to a maximum bitrate which may be supported by the client provided in the terminal capability information;

or the distribution server is further configured to:

acquire, before the distribution server selects the content segment, user level information and terminal capability information of the client; and correspondingly, select a content segment with a bitrate less than or equal to the data transmission rate, and less than or equal to a maximum bitrate which may be supported by the client provided in the user level information and the terminal capability information.

9. The distribution server according to claim 7, wherein the content segment request information received by the distribution server comprises a required bitrate;

the distribution server is specifically configured to compare the data transmission rate with the required bitrate; when the data transmission rate is less than the required bitrate, select a content segment with a bitrate less than or equal to the data transmission rate; and when the data transmission rate is greater than or equal to the required bitrate, select a content segment with a bitrate equal to the required bitrate.

10. The distribution server according to claim 7, wherein the content segment request information received by the distribution server comprises a required bitrate;

the distribution server is further configured to:

acquire, before the distribution server selects the content segment, user level information of the client; and correspondingly, compare the data transmission rate with the required bitrate; when the data transmission rate is less than the required bitrate, select a content segment with a bitrate less than or equal to the required bitrate; and when the data transmission rate is greater than or equal to the required bitrate, select a content segment with a bitrate greater than or equal to the required bitrate, less than or equal to the data transmission rate, and less than or equal to a maximum bitrate which may be supported by the client provided in the user level information;

or the distribution server is further configured to:

acquire, before the distribution server selects the content segment, terminal capability information of the client; and correspondingly, compare the data transmission rate with the required bitrate; when the data transmission rate is less than the required bitrate, select a content segment with a bitrate less than or equal to the data transmission rate; and when the data transmission rate is greater than or equal to the required bitrate, select a content segment with a bitrate greater than or equal to the required bitrate, less than or equal to the data transmission rate, and less than or equal to a maximum bitrate which may be supported by the client provided in the terminal capability information;

or the distribution server is further configured to:

acquire, before the distribution server selects the content segment, user level information and terminal capability information of the client; and correspondingly, compare the data transmission rate with the required bitrate; when the data transmission rate is less than the required bitrate, select a content segment with a bitrate less than or equal to the data transmission rate; and when the data transmission rate is greater than or equal to the required bitrate, select a content segment with a bitrate greater than or equal to the required bitrate, less than or equal to the data transmission rate, and less than or equal to a maximum bitrate which may be supported by the client provided in the user level information and the terminal capability information.

11. The distribution server according to claim 7, wherein the content segment request information received by the distribution server comprises a required bitrate; the distribution server is further configured to:

compare, before the distribution server selects the content segment, the required bitrate with a bitrate which may be supported by the client recorded in local information, and when the required bitrate is greater than the bitrate which may be supported by the client recorded in the local information, update the local information into information of the required bitrate; and correspondingly, select a content segment with a bitrate less than or equal to the data transmission rate, and less than or equal to the bitrate which may be supported by the client recorded in the current local information.

12. A processing method for streaming media of a client which comprises at least a processor executing program codes stored in a memory, which configure the client to perform functions, comprising:

sending, by the processor, content segment request information to a distribution server;

receiving, by the processor, a content segment sent by the distribution server, wherein the content segment is a content segment which matches a data transmission rate and is selected by the distribution server, after receiving the content segment request information sent by the client, through acquiring resource information of a wireless network where the client is located and predicting the data transmission rate of the wireless network according to the resource information, wherein the resource information comprises a historical transmission rate, and the data transmission rate is predicted according to the historical transmission rate by using a prediction method of linear minimum variance.

13. The processing method according to claim 12, wherein the content segment request information does not comprise a required bitrate;

before receiving the content segment sent by the distribution server, the method further comprises:

sending, by the processor, user level information and/or terminal capability information to the distribution server; and correspondingly, the content segment received is a content segment, selected by the distribution server, with a bitrate less than or equal to the data transmission rate, and less than or equal to a maximum bitrate which may be supported by the client provided in the user level information and/or the terminal capability information.

14. The processing method according to claim 12, wherein the content segment request information comprises a required bitrate;

correspondingly, the content segment received is a content segment, selected by the distribution server through comparing the data transmission rate with the required bitrate, with a bitrate less than or equal to the data transmission rate when the data transmission rate is less than the required bitrate, or a content segment selected with a bitrate equal to the required bitrate when the data transmission rate is greater than or equal to the required bitrate;

or before receiving the content segment sent by the distribution server, the method further comprises:

sending, by the processor, user level information and/or terminal capability information to the distribution server; and correspondingly, the content segment received is a content segment, selected by the distribution server through comparing the data transmission rate with the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to a maximum bitrate which may be supported by the client provided in the user level information and/or the terminal capability information when the data transmission rate is greater than or equal to the required bitrate.

15. A client, comprising at least a processor and a memory, the processor executing program codes stored in the memory, which configure the client to:

send content segment request information to a distribution server;

receive, after the client sends the content segment request information to the distribution server, a content segment sent by the distribution server, wherein the content segment is a content segment which matches a data transmission rate and is selected by the distribution server, after receiving the content segment request information sent by the client, through acquiring resource information of a wireless network where the client is located and predicting the data transmission rate of the wireless network according to the resource information, wherein the resource information comprises a historical transmission rate, and the data transmission rate is predicted according to the historical transmission rate by using a prediction method of linear minimum variance.

16. The client according to claim 15, wherein the content segment request information sent by the client does not comprise a required bitrate;

the client is further configured to:

send, before the client receives the content segment sent by the distribution server, user level information to the distribution server;

correspondingly, the content segment received by the client is a content segments, selected by the distribution server, with a bitrate less than or equal to the data transmission rate, and less than or equal to a maximum bitrate which may be supported by the client provided in the user level information;

or the client is further configured to:

send, before the client receives the content segment sent by the distribution server, terminal capability information to the distribution server;

correspondingly, the content segment received by the client is a content segment, selected by the distribution server, with a bitrate less than or equal to the data transmission rate, and less than or equal to a maximum bitrate which may be supported by the client provided in the terminal capability information;

or the client is further configured to:

send, before the client receives the content segment sent by the distribution server, user level information and terminal capability information to the distribution server;

correspondingly, the content segment received by the client is a content segments, selected by the distribution server, with a bitrate less than or equal to the data transmission rate, and less than or equal to a maximum bitrate which may be supported by the client provided in the user level information and the terminal capability information.

17. The client according to claim 15, wherein the content segment request information sent by the client comprises a required bitrate;

correspondingly, the content segment received by the client is a content segment, selected by the distribution server through comparing the data transmission rate with the required bitrate, with a bitrate less than or equal to the data transmission rate when the data transmission rate is less than the required bitrate, or a content segment selected with a bitrate equal to the required bitrate when the data transmission rate is greater than or equal to the required bitrate;

or the client is further configured to:

send, before the client receives the content segment sent by the distribution server, user level information to the distribution server;

correspondingly, the content segment received by the client is a content segment, selected by the distribution server through comparing the data transmission rate with the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to a maximum bitrate which may be supported by the client provided in the user level information when the data transmission rate is greater than or equal to the required bitrate;

or the client is further configured to:

send, before the client receives the content segment sent by the distribution server, terminal capability information to the distribution server;

correspondingly, the content segment received by the client is a content segment, selected by the distribution server through comparing the data transmission rate with the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to a maximum bitrate which may be supported by the client provided in the terminal capability information, when the data transmission rate is greater than or equal to the required bitrate;
or
the client is further configured to:
send, before the client receives the content segment sent by the distribution server, user level information and terminal capability information to the distribution server;
correspondingly, the content segment received by the client is a content segment, selected by the distribution server through comparing the data transmission rate with the required bitrate, with a bitrate less than or equal to the data transmission rate when the data transmission rate is less than the required bitrate, or a content segment selected with a bitrate greater than or equal to the required bitrate, less than or equal to the data transmission rate, and less than or equal to a maximum bitrate which may be supported by the client provided in the user level information and the terminal capability information when the data transmission rate is greater than or equal to the required bitrate.

\* \* \* \* \*